United States Patent
Murayama et al.

(10) Patent No.: US 6,767,613 B2
(45) Date of Patent: Jul. 27, 2004

(54) MAGNETIC RECORDING MEDIUM

(75) Inventors: Yuichiro Murayama, Odawara (JP); Hiroshi Hashimoto, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/265,709

(22) Filed: Oct. 8, 2002

(65) Prior Publication Data

US 2003/0152806 A1 Aug. 14, 2003

(30) Foreign Application Priority Data

Oct. 9, 2001 (JP) ........................................ 2001-311007
Oct. 15, 2001 (JP) ........................................ 2001-317258

(51) Int. Cl.$^7$ ............................................... G11B 5/702
(52) U.S. Cl. ........................ 428/141; 428/216; 428/328; 428/329; 428/425.8; 428/425.9; 428/694 BM; 428/694 BU; 428/694 BL
(58) Field of Search .................................. 428/141, 216, 428/328, 329, 425.8, 425.9, 694 BM, 694 BU, 694 BL

(56) References Cited

U.S. PATENT DOCUMENTS 5,776,590 A * 7/1998 Yamazaki et al. .......... 428/212
6,030,689 A * 2/2000 Matsubaguchi et al. .... 428/141
6,074,724 A * 6/2000 Inaba et al. ................. 428/141
6,500,551 B1 * 12/2002 Hashimoto et al. ...... 428/425.9

FOREIGN PATENT DOCUMENTS

WO          WO00/05714          * 2/2000

* cited by examiner

Primary Examiner—Stevan A. Resan
(74) Attorney, Agent, or Firm—Sughrue Mion, PLLC

(57) ABSTRACT

Disclosed are magnetic recording media having excellent running durability and electromagnetic characteristics and comprising a lower layer comprising a magnetic powder or nonmagnetic powder and a binder and one or more upper magnetic layers comprising a ferromagnetic powder and a binder in this order on a nonmagnetic support. In one mode, at least said lower layer comprises a binder comprising polyurethane resin having a glass transition temperature ranging from 100 to 200° C., and a magnetic layer positioned as the topmost layer among said upper magnetic layers comprises 5 to 1,000 surface protrusions of 10 to 20 nm in height per 100 $\mu m^2$ on the surface thereof. In another mode, at least a magnetic layer positioned as the topmost layer among said upper magnetic layers comprises a binder comprising polyurethane resin having a glass transition temperature ranging from 100 to 200° C., and said magnetic layer positioned as the topmost layer among the upper magnetic layers comprises 5 to 1,000 surface protrusions of 10 to 20 nm in height per 100 $\mu m^2$ on the surface thereof.

14 Claims, No Drawings

MAGNETIC RECORDING MEDIUM

FIELD OF THE INVENTION

The present invention relates to a magnetic recording medium having excellent running durability and electromagnetic characteristics.

BACKGROUND OF THE INVENTION

The magnetic recording media are widely employed in recording tapes, video tapes, floppy disks, and the like. In magnetic recording media, a magnetic layer in which ferromagnetic powder is dispersed in binder is laminated on a nonmagnetic support. The magnetic recording media must have a variety of high-level characteristics, such as electromagnetic characteristics, running durability, and running performance. That is, in audio tapes used to record and reproduce music, a greater ability to reproduce sound sources is required. Further, good electromagnetic characteristics such as the ability to reproduce a source image are required of video tapes. In addition to possessing such good electromagnetic characteristics, magnetic recording media must also have good running durability. The binder also plays an important role in improving durability and electromagnetic characteristics. Conventionally employed vinyl chloride resins, cellulose resins, urethane resins, acrylic resins, and the like have problems in that they yield magnetic layers with poor resistance to abrasion and pollute running system members of the magnetic tape.

Pollution of the magnetic head causes deterioration of electromagnetic characteristics. In particular, in equipment employed in high-density recording, the rotational speed of the magnetic heads is high. In digital videotape recorders, since the rotational speed of the magnetic head reaches 9,600 rpm, which is much higher speed than the 1,800 rpms of home-use analog videotape records and the 5,000 rpms of industrial-use products, the magnetic recording medium slides against the magnetic head at higher speed. Further, compact magnetic heads such as thin-film heads are now being employed, and there is a need for reduction in the pollution of magnetic heads by substances generated by the magnetic recording medium.

One way of achieving improvement with regard to this problem is to employ a hard binder to increase the hardness of the magnetic layer. For example, Japanese Unexamined Patent Publication (KOKAI) Heisei No. 11-96539 describes a magnetic recording medium in which polyurethane resin containing a diol component in the form of a dimer diol is employed as resin. Further, Japanese Unexamined Patent Publication (KOKAI) No. 2001-134921 employs a binder in the form of polyurethane resin using a polyol with a weight average molecular weight (Mw) of 400 to 5,000 having a prescribed polar group as a long-chain polyol component and a diol compound having both a ring structure and a long alkyl chain. When a polyurethane resin with a high glass transition temperature (Tg) is employed as binder, the coating strength increases, particularly at elevated temperature, affording good running durability. However, the Tg is increased by increasing ring-structured and urethane binding components. When ring-structured and urethane binding components are increased, there are problems in that solvent solubility decreases, precluding adequate dispersion and reducing coating smoothness.

Accordingly, it is an object of the present invention is to provide a magnetic recording medium having excellent running durability, a high degree of coating smoothness, and excellent electromagnetic characteristics.

SUMMARY OF THE INVENTION

The present inventors conducted extensive research into achieving the above-stated object. As a result, they discovered that incorporating a binder component in the form of polyurethane resin, the glass transition temperature of which ranged from 100 to 200° C., achieved good coating strength, and that specifying that the number of minute protrusions present on the surface of the magnetic layer permitted the achievement of a magnetic recording medium with both good running durability and good magnetic characteristics; the present invention was devised on that basis.

That is, the object of the present invention is achieved by:

(1) A magnetic recording medium comprising a lower layer comprising a magnetic powder or nonmagnetic powder and a binder and one or more upper magnetic layers comprising a ferromagnetic powder and a binder in this order on a nonmagnetic support, wherein at least said lower layer comprises a binder comprising polyurethane resin having a glass transition temperature ranging from 100 to 200° C., and a magnetic layer positioned as the topmost layer among said upper magnetic layers comprises 5 to 1,000 surface protrusions of 10 to 20 nm in height per 100 $\mu m^2$ on the surface thereof, or (2) A magnetic recording medium comprising a lower layer comprising a magnetic powder or nonmagnetic powder and a binder and one or more upper magnetic layers comprising a ferromagnetic powder and a binder in this order on a nonmagnetic support, wherein at least a magnetic layer positioned as the topmost layer among said upper magnetic layers comprises a binder comprising polyurethane resin having a glass transition temperature ranging from 100 to 200° C., and said magnetic layer positioned as the topmost layer among the upper magnetic layers comprises 5 to 1,000 surface protrusions of 10 to 20 nm in height per 100 $\mu m^2$ on the surface thereof.

Hereinafter, the magnetic recording medium described in (1) above will be referred to as the "first mode," and the magnetic recording medium described in (2) above as the "second mode."

The magnetic recording medium of the present invention is described in greater detail below.

The magnetic recording medium of the first mode of the present invention has a multilayered structure in which multilayered magnetic layers or nonmagnetic layer and a magnetic layer in this order are provided on a nonmagnetic support, and a binder comprising polyurethane with a glass transition temperature of 100 to 200° C. is employed in at least the lower layer (magnetic layer or nonmagnetic layer). The use of a binder comprising polyurethane with a high glass transition temperature in the present invention in at least the lower layer essentially causes the polyurethane-comprising binder of the present invention to also be incorporated into the upper magnetic layer by migration and the like during simultaneous multilayer-coating, inhibiting plastic flowing of the magnetic layer due to frictional heat generated by sliding of the recording and reproduction head against the magnetic layer surface, imparting high coating strength, and achieving good running durability. The effect is particularly marked when the upper magnetic layer is a thin layer.

The magnetic recording medium of the second mode of the present invention has a multilayered structure in which multilayered magnetic layers or nonmagnetic layer and a magnetic layer in this order are provided on a nonmagnetic support, and a binder comprising polyurethane with a glass transition temperature of 100 to 200° C. is employed in at least the magnetic layer positioned as the topmost layer. This polyurethane is also sometimes incorporated into the upper magnetic layer in other than the topmost layer, but is essentially not incorporated into the lower layer (magnetic layer or nonmagnetic layer). Incorporating a binder comprising polyurethane having a high glass transition temperature of the present invention into the magnetic layer positioned as the topmost layer imparts a high modulus of elasticity at high temperature to the magnetic layer, inhibits plastic flowing of the magnetic layer due to frictional heat generated by sliding of the recording and reproduction head against the magnetic layer surface, imparts high coating strength, and achieves good running durability. In particular, since the mechanical strength of the magnetic layer decreases when the magnetic layer positioned as the topmost layer is made thin, the effect of the polyurethane of the present invention is marked when the topmost layer magnetic layer is thin.

Electromagnetic characteristics are known to decrease when minute protrusions of 10 to 20 nm in height are present on the surface of the magnetic layer that is the topmost layer coming into contact with the head during recording and reproduction. However, polyurethane of high glass transition temperature contains a large number of structures with low solvent solubility, such as ring structures and urethane bonds. Thus, the use of polyurethane of high glass transition temperature decreases dispersion of the coating liquid and generates minute protrusions on the surface of the magnetic layer. In magnetic recording media of multilayered structure, particularly when the upper magnetic layer is a thin layer, even when polyurethane of high glass transition temperature is employed only in the lower layer, surface protrusions present in the lower layer also appear on the surface of the magnetic layer positioned as the top layer. As a result, there is a problem in that electromagnetic characteristics deteriorate.

Accordingly, in the magnetic recording medium of the present invention, reducing the number of surface protrusions with a height of 10 to 20 nm that are present on the surface of the magnetic layer positioned as the topmost layer to 5 to 1,000 per 100 $\mu m^2$ ensures good electromagnetic characteristics. Further, keeping the number of surface protrusions that are 10 to 20 nm in height to within the above-stated range reduces the coefficient of friction during running. Thus, it is possible to further enhance running durability. That is, in the present invention, good running durability is achieved both by employing a prescribed polyurethane resin and by specifying the number of surface protrusions.

The Polyurethane Resin

In the magnetic recording medium of the first mode of the present invention, the glass transition temperature (Tg) of the polyurethane resin contained in at least the lower layer (magnetic layer or nonmagnetic layer), and in the magnetic recording medium of the second mode of the present invention, that of the polyurethane resin contained in at least the magnetic layer positioned as the topmost layer, ranges from 100 to 200° C., preferably from 140 to 180° C. When Tg is less than 100° C., since the coating strength decreases at high temperature, good running durability is precluded. And when Tg exceeds 200° C., since dispersion decreases, electromagnetic characteristics deteriorate and running durability decreases. Since the polyurethane resin of the present invention has a high glass transition temperature, it is possible to obtain a magnetic recording medium that tends not to deteriorate or decompose in high-temperature environments and has good durability.

The polyurethane resin of the present invention desirably has a urethane group concentration ranging from 2.5 to 6.0 mmol/g, preferably ranging from 3.0 to 4.5 mmol/g. When the urethane group concentration is equal to or greater than 2.5 mmol/g, the Tg of the coating is high and good durability is achieved; when equal to or lower than 6.0 mmol/g, solubility in solvent is high, enhancing dispersion. An excessively high urethane group concentration necessarily precludes the incorporation of polyols, making it hard to control the molecular weight and the like, which is undesirable from the perspective of synthesis.

The weight average molecular weight (Mw) of the polyurethane resin of the present invention desirably ranges from 30,000 to 200,000, preferably from 50,000 to 100,000. When the molecular weight is equal to or greater than 30,000, coating strength is high and good durability can be achieved; when equal to or less than 200,000, solubility in solvent is high and dispersion is good.

Polar groups that are desirable in the polyurethane resin of the present invention are —$SO_3M$, —$OSO_3M$, —$PO_3M_2$, and —COOM, with —$SO_3M$ and —$OSO_3M$ being particularly desirable. The content of polar groups is desirably $1\times10^{-5}$ to $2\times10^{-4}$ eq/g. At equal to or greater than $1\times10^{-5}$ eq/g, adsorption onto magnetic material and nonmagnetic material is high and dispersion is good. On the other hand, at equal to or less than $2\times10^{-4}$ eq/g, solubility in solvent is high and dispersion is good.

The OH group content of the polyurethane resin is desirably 2 to 20 groups per molecule, preferably 3 to 15 groups per molecule. When two or more OH groups are contained per molecule, they react well with the isocyanate curing agent, resulting in high coating strength and good durability. On the other hand, when equal to or less than 15 OH groups are contained per molecule, solubility in solvent is high and dispersion is good. Compounds employed to impart OH groups may be compounds comprising three or more functional groups in the form of OH groups; examples are trimethylol ethane, trimethylol propane, trimellitic anhydride, glycerin, pentaerythritol, hexanetriol, and branching polyesters or polyether esters having three or more functional groups in the form of OH groups. Of these, the trifunctional compounds are preferred. Tetrafunctional and greater compounds react too rapidly with the curing agent and have short pot lives.

Examples of polyol components of the polyurethane resin employed in the binder of the present invention are: known polyols such as polyester polyols, polyether polyols, polycarbonate polyols, polyether ester polyols, polyolefin polyols, dimer diols, and other polyol compounds having ring-structures and long alkyl chains.

The molecular weight of the polyol is desirably about 500 to 2,000. When the molecular weight falls within the stated range, it is possible to substantially increase the weight ratio of the diisocyanate, increasing urethane bonds, strengthening the interaction between molecules, and yielding a coating of high glass transition temperature and high mechanical strength.

The above diol component is desirably a diol compound having a ring structure and a long alkyl chain. Here, the term "long alkyl chain" refers to an alkyl group with 2 to 18 carbon atoms. When the diol has a ring structure and a long alkyl chain, the curved structure affords good solubility in solvent. Thus, the urethane molecular chains adsorbing to the surface of the magnetic or nonmagnetic material in the coating liquid spread widely, serving to enhance dispersion stability and yielding good electromagnetic characteristics. Further, the ring structure yields polyurethane with a high glass transition temperature.

Particularly desirable diol compounds having a ring structure and long alkyl chains are denoted by the following formula.

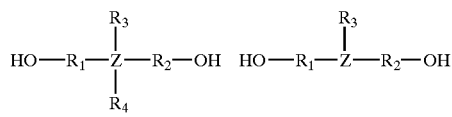

Z denotes a ring structure selected from a cyclohexane ring, benzene ring, or naphthalene ring. $R_1$ and $R_2$ denote alkylene groups having 1 to 18 carbon atoms. And $R_3$ and $R_4$ denote alkyl groups having 2 to 18 carbon atoms.

Desirably, 10 to 50 weight percent, and preferably, 15 to 40 weight percent, of the above-described diol component is incorporated into the polyurethane resin. At equal to or greater than 10 weight percent, solvent solubility is high and dispersion is good. At equal to or less than 50 weight percent, Tg is high and a coating with good durability is obtained.

In addition to the above-described diol component, other diol components may also be employed together as a chain extending agent in the polyurethane resin of the present invention. The higher the molecular weight of the diol component, necessarily the lower the content of diisocyanate becomes, and the more urethane bonds in the polyurethane decrease, compromising coating strength. Accordingly, to achieve adequate coating strength, chain extending agents that are employed together are desirably lower molecular weight diols having a molecular weight of less than 500, preferably equal to or less than 300.

Specific examples of compounds suitable for use are: ethylene glycol, 1,3-propanediol, propylene glycol, neopentyl glycol (NPG), 1,4-butanediol, 1,5-pentanediol, 1,6-hexanediol, 1,8-octanediol, 1,9-nonanediol, 2,2-dimethyl-1,3-propanediol, 2-ethyl-2-butyl-1,3-propanediol, 2,2-diethyl-1,3-propanediol, other aliphatic glycols, cyclohexane dimethanol (CHDM), cyclohexanediol (CHD), hydrogenated bisphenol A (H-BPA), other alicyclic glycols, ethylene oxide adducts thereof, propylene oxide adducts thereof, bisphenol A (BPA), bisphenol S, bisphenol P, bisphenol F, other aromatic glycols, ethylene oxide adducts thereof, and propylene oxide adducts thereof. The compound of preference is hydrogenated bisphenol A.

Known diisocyanates may be employed in the polyurethane resin of the present invention. Specific preferred examples are: tolylene diisocyanate (TDI), diphenylmethane diisocyanate (MDI), p-phenylene diisocyanate, o-phenylene diisocyanate, m-phenylene diisocyanate, xylylene diisocyanate, hydrogenated xylylene diisocyanate, and isophorone diisocyanate.

A vinyl chloride-based synthetic resin may additionally be employed in the polyurethane resin of the present invention. The degree of polymerization of vinyl chloride-based resins suitable for use is desirably 200 to 600, preferably 250 to 450. For example, the vinyl chloride-based resin obtained by copolymerization of a vinyl monomer such as vinyl acetate, vinyl alcohol, vinylidene chloride, acrylonitrile, or the like may be employed.

In addition to a vinyl chloride-based resin, various other synthetic resins may be employed in the polyurethane resin of the present invention. Examples of compounds suitable for use are: ethylene-vinyl acetate copolymer, cellulose derivatives such as nitrocellulose resin, acrylic resin, polyvinyl acetal resin, polyvinyl butyral resin, epoxy resin, and phenoxy resin. These may be employed singly or in combination.

When employing additional synthetic resins, the polyurethane resin contained in the magnetic layer is desirably incorporated in a proportion of 10 to 90 weight percent, preferably 20 to 80 weight percent, and more preferably, 25 to 60 weight percent, into the binder. The vinyl chloride-based resin is desirably incorporated into the binder in a proportion of 10 to 80 weight percent, preferably 20 to 70 weight percent, and more preferably, 30 to 60 weight percent, into the binder.

A curing agent such as polyisocyanate compounds may be employed with the binder of the present invention. Examples of polyisocyanate compounds are: the reaction product of three moles of tolylene diisocyanate and one mole of trimethylol propane (for example, Desmodule L-75 (made by Bayer Co.), the reaction product of three moles of a diisocyanate such as xylylene diisocyanate or hexamethylene diisocyanate with one mole of trimethylol propane, biuret addition compounds with three moles of hexanemethylene diisocyanate, isocyanurate compounds of five moles of tolylene diisocyanate, isocyanurate addition compounds of three moles of tolylene diisocyanate with two moles of hexamethylene diisocyanate, and polymers of isophorone diisocyanate and diphenylmethane diisocyanate.

The polyisocyanate compound contained in the magnetic layer is desirably incorporated into the binder in a range of 10 to 50 weight percent, preferably in a range of 20 to 40 weight percent. When curing by electron-beam irradiation, it is possible to employ compounds having reactive double bonds, such as urethane acrylate. The total weight of resin component and curing agent (that is, of binder) normally desirably ranges from 15 to 40 weight parts, preferably 20 to 30 weight parts, per 100 weight parts of ferromagnetic powder.

In the magnetic layer of the first mode, a known binder may be additionally employed in the lower layer, and in the magnetic recording medium of the second mode, in the upper layer. Examples are known polyurethane in which polyester, polycarbonate, polyether, polyolefin, or other polyol is employed, polyvinyl-based one in which vinyl chloride, vinyl acetate, vinyl alcohol, vinylidene chloride, acrylonitrile, or the like is copolymerized.

Number of Surface Protrusions

There are 5 to 1,000 surface protrusions of 10 to 20 nm in height per 100 $\mu m^2$ on the surface of the magnetic layer positioned as the topmost layer of the magnetic recording medium of the present invention. Preferably, the number of surface protrusions of 10 to 20 nm in height is 5 to 200 per $\mu m^2$. When there are fewer than five surface protrusions of 10 to 20 nm in height per 100 $\mu m^2$, the coefficient of friction during running increases and running durability drops. When there are more than 1,000, electromagnetic characteristics decrease.

When there is a large number of surface protrusions exceeding 20 nm in height, the spacing loss with the head increases, causing deterioration of electromagnetic characteristics. Thus, there are desirably few surface protrusions exceeding a height of 20 nm present on the magnetic layer positioned as the topmost layer. In addition, to further enhance electromagnetic characteristics, there are desirably few surface protrusions of less than 10 nm in height.

Surface protrusions on the magnetic layer positioned as the topmost layer can be controlled through the particle size of the magnetic material, abrasives, and carbon black contained in the topmost layer; through the particle size of the magnetic material or nonmagnetic material, abrasives, and carbon black and other inorganic powders contained in the lower layer; through the type of binder for dispersing them and the type of lubricant; and through the kneading conditions, dispersion conditions, coating layer thickness, coating drying conditions, calendering conditions, and the like during preparation of the upper layer liquid and lower layer liquid.

Specifically, in the first mode, the kneading conditions desirably render the kneaded solid component concentration from 65 to 85 weight percent during preparation of the lower layer coating liquid. Within this range, dispersion is good, there are few minute surface protrusions on the topmost magnetic layer, and high smoothness can be obtained.

In the second mode, the kneading conditions desirably render the kneaded solid component concentration from 75 to 95 weight percent during preparation of the upper layer coating liquid. Within this range, dispersibility is good, there are few minute surface protrusions on the topmost magnetic layer, and high smoothness can be obtained. Further, the kneaded solid component concentration during preparation of the lower layer coating solution is desirably made from 65 to 85 weight percent. Within this range, dispersibility is good, there are few minute protrusions present at the interface between the upper layer and the lower layer, and as a result, the number of minute protrusions present on the topmost magnetic layer can be reduced.

Dispersion may be conducted in a ball mill, sand grinder, atliter, or some other dispersion unit. To the extent to which dispersion is still possible, the viscosity of the coating liquid (solid component concentration) is desirably increased to increase dispersion shear. Increasing dispersion shear increases dispersibility in the coating liquid.

Calendering is desirably conducted at a roll temperature of 60 to 100° C., preferably 70 to 90° C., with a linear pressure of 980 to 4,900 N/cm, preferably 1,960 to 4,412 N/cm. When calendering is conducted under these conditions, a coating with good surface smoothness is obtained. The processing rolls may be in the form of heat-resistant plastic rolls, such as epoxy, polyimide, polyamide, polyamidoimide rolls described further below, with metal rolls being preferred.

As described above, there are various methods for controlling the number of protrusions on the surface of the magnetic layer at the topmost position. These methods may be suitably combined for use to obtain the surface state defined for the magnetic recording medium of the present invention.

The surface protrusions of the magnetic recording medium of the present invention are measured by atomic force microscope (AFM). Specifically, using Nanoscope III (AFM) from Digital Instruments, the number of minute protrusions is measured in 5 nm increments for heights of 10 to 20 nm over a 10 $\mu$m square (100 $\mu$m$^2$) with a 70-degree edge, square cone SiN probe.

Ferromagnetic Powder

The ferromagnetic powder employed in the magnetic recording medium of the present invention is cobalt-containing ferromagnetic iron oxide or ferromagnetic alloy powder with a $S_{BET}$ specific surface area of 40 to 80 m$^2$/g, preferably from 50 to 70 m$^2$/g. The crystallite size is 12 to 25 nm, preferably 13 to 22 nm, and more preferably, 14 to 20 nm. The major axis length is 0.05 to 0.25 $\mu$m, preferably 0.07 to 0.2 $\mu$m, and more preferably, 0.08 to 0.15 $\mu$m. Examples of ferromagnetic powders are yttrium-containing Fe, Fe—Co, Fe—Ni, Co—Ni—Fe. The content of yttrium in the ferromagnetic powder, given as the ratio of yttrium atoms to iron atoms, Y/Fe, is desirably 0.5 to 20 atomic percent, preferably 5 to 10 atomic percent. At equal to or greater than 0.5 atomic percent, it is possible to achieve a high $\sigma_s$ in the magnetic powder, enhancing magnetic characteristics and yielding good electromagnetic characteristics. At equal to or less than 20 atomic percent, the content of iron is suitable and magnetic characteristics are good, enhancing electromagnetic characteristics. Further, within a range of equal to or less than 20 atomic percent for 100 atomic percent of the iron, it is also possible to incorporate aluminum, silicon, sulfur, scandium, titanium, vanadium, chromium, manganese, copper, zinc, molybdenum, rhodium, palladium, tin, antimony, boron, barium, tantalum, tungsten, rhenium, aurum, lead, phosphorus, lanthanum, cerium, praseodymium, neodymium, tellurium, bismuth, and the like. Further, the ferromagnetic metal powder may also contain a small amount of water, hydroxides, or oxides.

An example of a method of manufacturing ferromagnetic powder incorporating cobalt and yttrium will be given below. In this example, an oxidizing gas is blown into an aqueous suspension obtained by mixing ferrous salt and an alkali to obtain iron oxyhydroxide, which is employed as starting material. The iron oxyhydroxide is desirably $\alpha$-FeOOH. In the first manufacturing method, ferrous salt is neutralized with an alkali hydroxide to prepare a Fe(OH)$_2$ aqueous suspension. An oxidizing gas is blown into this suspension to obtain acicular $\alpha$-FeOOH. In the second manufacturing method, ferrous salt is neutralized with an alkaline carbonate to prepare a FeCO$_3$ aqueous suspension. An oxidizing gas is blown into this aqueous suspension to obtain spindle-shaped $\alpha$-FeOOH. Such an iron oxyhydroxide is desirably obtained by reacting a ferrous salt aqueous solution with an alkali aqueous solution to obtain an aqueous solution comprising ferrous hydroxide, and then oxidizing it with air or the like. In this process, salts of alkaline earth elements such as Ni salt, Ca salt, Ba salt, and Sr salt, as well as Cr salt and Zn salt, may be present together in the ferrous salt aqueous solution. The suitable selection and use of such salts makes it possible to adjust the shape (axial ratio) and the like of the particles.

Desirable forms of ferrous salts are ferrous chloride, ferrous sulfate, and the like. Preferred alkalis are sodium hydroxide, ammonia water, ammonium carbonate, sodium carbonate, and the like. Examples of salts that can also be present are nickel chloride, calcium chloride, barium chloride, strontium chloride, chromium chloride, zinc chloride, and other chlorides. Next, when introducing cobalt into the iron, prior to introducing yttrium, the aqueous solution of a cobalt compound such as cobalt sulfate or cobalt chloride is admixed to the above-described slurry of iron oxyhydroxide. After preparing an iron oxyhydroxide slurry containing cobalt, an aqueous solution containing an yttrium compound is added to the slurry and mixed in by stirring to introduce.

In addition to yttrium, it is possible to introduce neodymium, samarium, praseodymium, and lanthanum to the ferromagnetic powder of the present invention. These can be introduced in the form of chlorides such as neodymium chloride, samarium chloride, praseodymium chloride, and lanthanum chloride, and nitrates such as neodymium nitrate and gadolinium nitrate. Two or more such compounds may also be employed. Although the form of the ferromagnetic powder is not specifically limited, powder that is acicular, granular, cubic, rice particle-shaped, or plate-shaped is normally employed. Acicular ferromagnetic powder is preferably employed.

The above-described resin component, curing agent, and ferromagnetic powder are normally kneaded with and dispersed in a solvent such as methyl ethyl ketone, dioxane, cyclohexanone, or ethyl acetate, which is normally employed for preparing a magnetic coating liquid, to obtain a magnetic coating material. The kneading and dispersion may be conducted by the usual methods. In addition to the above-listed components, the magnetic coating material may also comprise abrasives such as $\alpha\text{-}Al_2O_3$ and $Cr_2O_3$; antistatic agents such as carbon black; lubricants such as fatty acids, fatty esters, and silicone oil; dispersants; and other commonly employed additives and fillers.

Lower Layer

The lower layer (magnetic layer or nonmagnetic layer) of the present invention will be described below.

If the lower layer of the present invention is a nonmagnetic layer, the nonmagnetic powder contained in the lower layer can be selected from inorganic compounds such as metal oxides, metal carbonates, metal sulfates, metal nitrides, metal carbides, metal sulfides and the like. Examples of inorganic compounds are α-alumina having an α-conversion rate of 90 to 100 percent, β-alumina, γ-alumina, silicon carbide, chromium oxide, cerium oxide, α-iron oxide, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particular desirable are titanium dioxide, zinc oxide, iron oxide and barium sulfate. Even more preferred is titanium dioxide. The mean particle diameter of these nonmagnetic powders preferably ranges from 0.005 to 2 $\mu$m, but nonmagnetic powders of differing particle diameter may be combined as needed, or the particle diameter distribution of a single nonmagnetic powder may be broadened to achieve the same effect. What is preferred most is a particle diameter in the nonmagnetic powder ranging from 0.01 to 0.2 $\mu$m Particular preferred is the pH of the nonmagnetic powder between 6 and 9. The specific surface area of the nonmagnetic powder ranges from 1 to 100 $m^2/g$, preferably from 5 to 50 $m^2/g$, further preferably from 7 to 40 $m^2/g$. The crystallite size of the nonmagnetic powder preferably ranges from 0.01 to 2 $\mu$m. The oil absorption capacity using dibutyl phthalate (DBP) ranges from 5 to 100 ml/100 g, preferably from 10 to 80 ml/g, further preferably from 20 to 60 ml/100 g. The specific gravity ranges from 1 to 12, preferably from 3 to 6. The shape may be any of acicular, spherical, polyhedral, or plate-shaped.

The surface of these nonmagnetic powders is preferably treated with $Al_2O_3$, $SiO_2$, $TiO_2$, $ZrO_2$, $SnO_2$, $Sb_2O_3$ and ZnO. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Carbon black can be added to the lower layer. Mixing carbon black achieves the known effects of lowering surface resistivity Rs, as well as yielding the desired micro Vickers hardness. Examples of types of carbon black that are suitable for use are furnace black for rubber, thermal for rubber, black for coloring and acetylene black. The specific surface area of carbon black ranges from 100 to 500 $m^2/g$, preferably from 150 to 400 $m^2/g$ and the DBP oil absorption capacity ranges from 20 to 400 ml/100 g, preferably from 30 to 200 ml/100 g. The particle diameter of carbon black ranges from 5 to 80 nm (m$\mu$), preferably from 10 to 50 nm (m$\mu$), further preferably from 10 to 40 nm (m$\mu$). It is preferable for carbon black that the pH ranges from 2 to 10, the moisture content ranges from 0.1 to 10 percent and the tap density ranges from 0.1 to 1 g/ml. Specific examples of types of carbon black suitable for use in the present invention are: BLACK PEARLS 2000, 1300, 1000, 900, 800, 880, 700 and VULCAN XC-72 from Cabot Corporation; #3050B, 3150B, 3250B, #3750B, #3950B, #950, #650B, #970B, #850B and MA-600; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd.

When the lower layer of the present invention is a magnetic layer, an alloy comprised chiefly of $\gamma\text{-}Fe_2O_3$, Co-modified $\gamma\text{-}Fe_2O_3$, and $\alpha\text{-}Fe$, $CrO_2$, or the like may be employed as the magnetic powder. Co-modified $\gamma\text{-}Fe_2O_3$ is preferred. The ferromagnetic powder employed in the lower layer of the present invention desirably has the same composition and functions as the ferromagnetic powder employed in the upper magnetic layer. However, it is known that the properties of the upper and lower layers may be varied based on the objective. For example, to improve long wavelength recording characteristics, the Hc of the lower magnetic layer is desirably set lower than that of the upper magnetic layer, and it is effective to make the Br of the lower magnetic layer higher than that of the upper magnetic layer. Additionally, known multilayered structures may be advantageously adopted.

Binders, lubricants, dispersing agents, additives, solvents, dispersion methods, and the like suited to the magnetic layer may be adopted to the lower magnetic or nonmagnetic layer. In particular, known techniques for the quantity and type of binder and the quantity and type of additives and dispersant employed in the magnetic layer may be adopted thereto.

The magnetic or nonmagnetic coating liquid prepared by the above-mentioned materials is coated on the nonmagnetic support to form the lower layer. The nonmagnetic support suitable for use in the present invention can be known films such as biaxially oriented polyethylene naphthalate, polyethylene terephthalate, polyamides, polyimides, polyamidoimides, aromatic polyamides, and polybenzoxazoles. Polyethylene naphthalate and aromatic polyamides are preferred. These nonmagnetic supports may be subjected beforehand to corona discharge treatment, plasma treatment, adhesion-enhancing treatment and heat treatment. It is further desirable for a nonmagnetic support suitable for use in the present invention to have a surface with good smoothness in the form of a centerline average surface roughness falling within a range of 0.1 to 20 nm, preferably 1 to 10 nm, at a cutoff value of 0.25 mm. It is further desirable for these nonmagnetic supports to have not only a low centerline average surface roughness, but also to have no rough protrusions of 1 $\mu$m or greater.

Layer Structure

The magnetic recording medium of the first mode has a multilayered structure in which a lower layer (nonmagnetic layer or magnetic layer) and at least one magnetic layer are provided on a nonmagnetic support. Simultaneous multilayer-coating of the lower layer and at least the adjacent magnetic layer causes the binder of the present invention that is contained in the lower layer to diffuse by migration or the like into the magnetic layer positions as the upper layer, essentially incorporating the binder of the present invention into the upper magnetic layer, as well. Thus, even when the binder of the present invention is not blended into the upper magnetic layer, the effect based on the binder of the present invention can still be achieved. This effect is particularly marked when a thin magnetic layer is employed as the upper magnetic layer.

Thus, when the upper magnetic layer is a single layer, the thickness of the upper magnetic layer is desirably 0.05 to 1.0 μm, preferably 0.05 to 0.5 μm, more preferably 0.1 to 0.5 μm. At greater than or equal to 0.05 μm, nonuniform coating thickness does not occur, permitting uniform coating of the magnetic layer. At equal to or less than 1.0 μm, the binder of the present invention that is incorporated into the lower layer of the present invention diffuses well into the upper magnetic layer, yielding good durability. That is, when the upper magnetic layer has a thickness within the above-stated range, a magnetic layer with good smoothness and mechanical strength is obtained.

Further, when the upper magnetic layer consists of plural magnetic layers, the thickness of the magnetic layer positioned as the topmost layer is 0.05 to 1.0 μm, preferably 0.05 to 0.5 μm, more preferably 0.1 to 0.5 μm, and the total thickness of the upper magnetic layers is 1.0 to 2.5 μm, preferably 1.0 to 1.5 μm. When the layer structure of the magnetic layers falls within the above-stated range, a magnetic layer with good smoothness and mechanical strength is achieved.

The magnetic recording medium of the second mode also has a multilayered structure having a lower layer (nonmagnetic layer or magnetic layer) and at least a single magnetic layer on a nonmagnetic support. Simultaneous multilayer-coating of the topmost magnetic layer and at least the adjacent upper magnetic layer causes the binder of the present invention that is contained in the topmost magnetic layer to diffuse by migration or the like into the upper magnetic layer, essentially incorporating the binder of the present invention into an upper magnetic layers other than the topmost magnetic layer. This effect is particularly marked when a thin layer magnetic layer is employed as the upper magnetic layer.

When the upper magnetic layer is a single layer, the thickness thereof is 0.05 to 1.0 μm, preferably 0.05 to 0.5 μm, more preferably 0.1 to 0.5 μm. When the upper magnetic layer has a thickness within the above-stated range, a magnetic layer with good smoothness and mechanical strength is obtained.

Further, when the upper magnetic layer consists of plural magnetic layers, the thickness of the magnetic layer positioned as the topmost layer is 0.05 to 1.0 μm, preferably 0.05 to 0.5 μm, and the total thickness of the upper magnetic layers is 1.0 to 2.5 μm, preferably 1.0 to 1.5 μm. When the layer structure of the magnetic layers falls within the above-stated range, a magnetic layer with good smoothness and mechanical strength is achieved.

In the method of manufacturing the magnetic recording medium of the present invention, for example, the magnetic layer coating material is coated either following or simultaneously with application of the lower layer coating liquid to the surface of the nonmagnetic support during running to a thickness yielding the above-described preferred magnetic layer thickness once the magnetic layer has dried. In the first mode, coating is conducted to achieve a lower layer dry thickness of 1.0 to 2.0 μm, preferably 1.2 to 1.5 μm. In the second mode, coating is conducted to achieve a lower layer dry thickness of 1.0 to 2.0 μm, preferably 1.0 to 1.5 μm.

Coating machines suitable for use in coating the magnetic coating material mentioned above are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center (K.K.) may be referred to in this regard.

The followings are examples - of coating devices and methods applicable to the magnetic recording medium of the present invention.

(1) A method in which the lower layer is first applied with a coating device commonly employed to apply magnetic coating materials such as a gravure coating, roll coating, blade coating, or extrusion coating device, and the upper layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672;

(2) A method in which the upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672; and (3) A method in which the upper and lower layers are applied nearly simultaneously using an extrusion coating apparatus with a backup roller as disclosed in Japanese Unexamined Patent Publication (KOKAI) Heisei No. 2-174965.

A backcoat (backing) layer may be provided on the side of the nonmagnetic support employed in the present invention on which the magnetic coating material is not applied. The usual backcoat layer is a layer provided by coating, on the side of the nonmagnetic support on which the magnetic coating material is not applied, a backcoat layer coating material obtained by dispersing granular components such as abrasives and antistatic agents and a binder in an organic solvent. An adhesive layer may be provided on the coating surfaces of the magnetic coating material on the nonmagnetic support and the backcoat layer forming coating material. After the ferromagnetic powder is magnetically orientated, the coating layer coated with the magnetic coating material is dried.

After drying in this manner, the coating layer is preferably processed for surface smoothness. For example, super calender rolls or the like may be employed in the surface smoothness treatment. Processing the surface for smoothness eliminates voids generated by elimination of the solvent during drying and increases the fill rate of ferromagnetic powder in the magnetic layer, yielding a magnetic recording medium with good electromagnetic characteristics. The calendering rolls employed may be heat-resistant plastic rolls of epoxy, polyimide, polyamide, or polyamideimide, and metal rolls. Processing is preferably conducted with metal rolls.

The magnetic recording medium of the present invention desirably has a surface with extremely good smoothness in the form of a centerline average roughness of 0.1 to 4 nm, preferably 1 to 3 nm, at a cutoff value of 0.25 mm on the magnetic layer surface. The method comprises selecting specific ferromagnetic powders and binders such as those set forth above, forming a magnetic layer, and calendering it as set forth above. The magnetic recording medium obtained is cut to the desired size by a cutter or the like for use.

Embodiments

Embodiments and comparative examples are described below to described the present invention in greater detail. The "parts" in the embodiments denote "weight parts."

Example of Polyurethane Synthesis

The diol components shown in Table 1 were dissolved at 60° C. under a nitrogen gas flow in a 30 percent solution of cyclohexanone in a vessel previously backfilled with nitrogen gas having a reflux condenser and stirrer. A 60 ppm quantity of dibutyltin dilaurate was then added as catalyst and dissolved for another 15 min. The MDI shown in Table 1 was added and the mixture was reacted with heating for 6 hours at 90° C., yielding polyurethane resin solution A.

Polyurethanes B through H were obtained from the starting materials and with the composition ratios indicated in Table 1 by the same method as polyurethane A. The molecular weights and Tg of the polyurethanes obtained are given in Table 1.

First Mode

EMBODIMENT 1

One hundred parts of ferromagnetic alloy powder (composition: 89 atomic percent Fe, 5 atomic percent Co, 6 atomic percent Y, Hc 159 kA/m (2,000 Oe), crystallite size 15 nm; BET specific surface area 59 m$^2$/g, major axis diameter 0.12 μm; acicular ratio 7; $\sigma_s$ 150 A·m$^2$/kg (150 emu/g)) were comminuted for 10 min in an open kneader, 10 parts (solid component) of polyurethane solution H and 30 parts of cyclohexanone were added, and kneading was conducted for 60 min.

| Next, | |
|---|---|
| Abrasive (Al$_2$O$_3$, particle size: 0.3 μm) | 2 parts |
| Carbon black (particle size: 40 μm) | 2 parts |
| Methyl ethyl ketone/Toluene = 1/1 | 200 parts | were added and dispersed with a sand mill for 120 min, to which

| Polyisocyanate | 5 parts (solid component) |
|---|---|
| (Coronate 3041 made by Nippon Polyurethane Co., Ltd.) | |
| Butyl stearate | 2 parts |
| Stearic acid | 1 part |
| Methyl ethyl ketone | 50 parts | were added, and stirred and mixed for another 20 min. Thereafter, it was filtrated with a filter having a mean pore diameter of 1 μm to prepare the upper layer magnetic coating material.

One hundred parts of α-Fe$_2$O$_3$ (mean particle diameter 0.15 μm, S$_{BET}$ 52 m$^2$/g, surface treated with Al$_2$O$_3$ and SiO$_2$, pH 6.5 to 8.0) were comminuted for 10 min in an open kneader; 7.5 parts of a compound (SO$_3$Na=6×10$^{-5}$ eq/g, epoxy=10$^{-3}$ eq/g, MW 30,000) obtained by adding hydroxyethyl sulfonate sodium salt to a 86/9/5 copolymer of vinyl chloride, vinyl acetate, and glycidyl methacrylate and 10 parts of polyurethane A (solid component) were added, 30 parts of cyclohexanone were added, and kneading was conducted for 60 min.

| Next, | |
|---|---|
| Methyl ethyl ketone/cyclohexanone = 6/4 | 200 parts |
| were added and dispersed with a sand mill for 120 min, to which | |
| Polyisocyanate | 5 parts (solid component) |
| (Coronate 3041, made by Nippon Polyurethane) | |
| Butyl stearate | 2 parts |
| Stearic acid | 1 part |
| Methyl ethyl ketone | 50 parts | were added, and stirred and mixed for another 20 min. Thereafter, it was filtrated with a filter having a mean pore diameter of 1 μm to prepare the lower layer magnetic coating material.

Next, a coiled bar was employed to coat sulfonic acid-containing polyester resin as an adhesive layer onto the surface of an aramide support 4 μm in thickness to yield a dry thickness of 0.1 μm. Simultaneous mulitilayer coating was then conducted by coating the lower layer coating material obtained so as to yield a dry thickness of 1.5 μm, and immediately thereafter, coating the upper layer magnetic coating material so as to yield a dry thickness of 0.05 μm with a reverse roll. The nonmagnetic support upon which the magnetic coating materials had been applied was then subjected to magnetic field orientation with a 0.5 T (5,000 Gauss) Co magnet and a 0.4 T (4,000 gauss) solenoid magnetic while the magnetic coating material was still wet. The coated one was calendered with a series of seven metal rolls at a rate of 100 m/min, a linear pressure of 2,942 N/cm, and a temperature of 90° C., and then slit into a width of 3.8 mm.

EMBODIMENTS 2–5 AND COMPARATIVE EXAMPLES 1–5

These were prepared by the same method as in Embodiment 1 by varying the upper layer polyurethane, lower layer polyurethane, and coating thickness as indicated in Table 2.

EMBODIMENT 6

With the exception that the α-Fe$_2$O$_3$ (mean particle diameter 0.15 μm, S$_{BET}$ 52 m$^2$/g, surface treated with Al$_2$O$_3$ and SiO$_2$, pH 6.5 to 8.0) in the lower layer liquid was replaced with titanium oxide (mean particle diameter 0.035 μm, rutile crystal form, TiO$_2$ content of 90 percent or greater, alumina surface treatment layer, S$_{BET}$ 35 to 42 m$^2$/g, true specific gravity 4.1, pH 6.5 to 8.0), this embodiment was produced by the same method as in Embodiment 5.

COMPARATIVE EXAMPLE 6

With the exception that the quantity of cyclohexanone solvent employed during kneading of the lower layer liquid was changed from 30 parts to 60 parts, this comparative example was prepared by the same method as in Embodiment 2.

Second Mode

EMBODIMENT 8

With the exception that polyurethane H was employed instead of polyurethane A in the preparation of the lower layer coating material, this embodiment was prepared in the same manner as in Embodiment 1.

EMBODIMENTS 9–12 AND COMPARATIVE EXAMPLES 7–10

The upper layer polyurethane, lower layer polyurethane, and coating thickness were changed as indicated in Table 3, and these embodiments were prepared by the same method as in Embodiment 8.

EMBODIMENT 13

With the exception that the α-Fe$_2$O$_3$ (mean particle diameter 0.15 μm, S$_{BET}$ 52 m$^2$/g, surface treated with Al$_2$O$_3$ and SiO$_2$, pH 6.5 to 8.0) in the lower layer liquid was replaced with titanium oxide (mean particle diameter 0.035 μm, rutile crystal form, TiO$_2$ content of 90 percent or greater, alumina surface treatment layer, S$_{BET}$ 35 to 42 m$^2$/g, true specific gravity 4.1, pH 6.5 to 8.0), this embodiment was produced by the same method as in Embodiment 9.

Measurement Methods (1) Polyurethane Tg

Employing a dynamic viscoelasticity measuring device, the Rheovibron, made by A&D Co., measurements were conducted at a temperature increase rate of 2° C./min, and the Tg was obtained as the peak temperature of the loss of modulus of elasticity.

(2) Weight Average Molecular Weight of Polyurethane

Employing a high-speed GPC HLC 8020 made by Tosoh Corporation, measurements were conducted with THF as solvent at a flow rate of 1 cc/min with an RI detector, and the MW was obtained by standard polystyrene conversion.

(3) Number of Minute Protrusions

Employing Nanoscope III (AFM) made by Digital Instruments, the number of minute protrusions was measured in 5 nm increments up to a height of 20 nm over a 10 μm square area (100 μm$^2$) with a 70-degree edge, square cone SiN probe.

(4) Electromagnetic Characteristics

A 4.7 MHz single-frequency signal was recorded at optimal recording current with a DDS4 drive, and the reproduction output thereof was measured. It was given as a relative value taking the reproduction output of Comparative Example 1 as 0 dB.

(5) Increase in Repeat Coefficient of Friction

In a 50° C., 20 percent RH environment, the magnetic layer surface was brought into contact with the guide poles employed in the DDS4 drive. A load of 20 g (T1) was applied, a tension (T2) yielding 8 mm/sec was applied, and the coefficient of friction of the magnetic surface to the guide pole was calculated as T2/T1. Measurement was conducted for 100 passes and the coefficient of friction of the 1,000$^{th}$ pass was calculated when the coefficient of friction of the first pass was taken as 1.

(6) Coating Damage

The magnetic layer surface of the sample following the measurement of (5) was observed by differential interference optical microscope and evaluated on the following scale:

| | |
|---|---|
| Excellent: | No scratching whatsoever |
| Good: | Some scratching evident, but more unscratched portions present than scratched portions. |
| Poor: | More scratched portions present than unscratched portions. |

TABLE 1

| Polyurethane | Structure | Weight average molecular weight | Tg |
|---|---|---|---|
| A | DD/HBpA/DEIS/MDI = 40/60/2/100 molar ratio | 48000 | 100° C. |
| B | DD/HBpA/DEIS/MDI = 15/85/2/100 molar ratio | 47500 | 160° C. |
| C | DD/HBpA/DEIS/MDI = 5/95/2/100 molar ratio | 46000 | 200° C. |
| D | DD/HBpA/DEIS/MDI = 0/100/2/100 molar ratio | 49000 | 220° C. |
| E | DD/HBpA/DEIS/MDI = 50/50/2/100 molar ratio | 47000 | 90° C. |
| F | Polyester polyol a/DEIS/MDI = 100/2/100 molar ratio | 51000 | 100° C. |
| G | Polyester polyol b/DEIS/MDI = 100/2/101 molar ratio | 38000 | 90° C. |
| H | Polyester polyol c/DEIS/MDI = 100/2/102 molar ratio | 42000 | 80° C. |

DD: Dimer diol
HBpA: Hydrogenated bisphenol A
DEIS: Sulfoisophthalic acid ethyleneoxide adduct
MDI: Diphenylmethane diisocyanate
Polyester polyol a: Isophthalic acid/neopentyl glycol = 1.5/1 molar ratio
Polyester polyol b: Isophthalic acid/adipic acid/neopentyl glycol = 1.3/0.2/1 molar ratio
Polyester polyol c: Isophthalic acid/adipic acid/neopentyl glycol = 0.8/0.7/1 molar ratio

TABLE 2

| | Upper layer polyurethane | | Lower layer polyurethane | | Thickness of coating | | Number of minute protrusions | Electromagnetic characteristics | Increase in repeat coefficient of friction | Coating damage |
|---|---|---|---|---|---|---|---|---|---|---|
| | Name | Tg | Name | Tg | Upper layer | Lower layer | | | | |
| Embodiment 1 | H | 80° C. | A | 100° C. | 0.05 μm | 1.5 μm | 5 | 3.1 | 1.5 | Excellent |
| Embodiment 2 | H | 80° C. | B | 160° C. | 0.05 μm | 1.5 μm | 328 | 2.4 | 1.1 | Excellent |
| Embodiment 3 | H | 80° C. | C | 200° C. | 0.05 μm | 1.5 μm | 983 | 1.5 | 1 | Excellent |
| Embodiment 4 | H | 80° C. | B | 160° C. | 1.0 μm | 1.5 μm | 245 | 2.6 | 1.1 | Excellent |
| Embodiment 5 | B | 160° C. | B | 160° C. | 0.05 μm | 1.5 μm | 532 | 2.3 | 1.1 | Excellent |
| Embodiment 6 | B | 160° C. | B | 160° C. | 0.05 μm | 1.5 μm | 423 | 2.3 | 1.1 | Excellent |
| Embodiment 7 | H | 80° C. | F | 100° C. | 0.05 μm | 1.5 μm | 10 | 2.9 | 1.6 | Excellent |
| Comp.Ex.1 | H | 80° C. | D | 220° C. | 0.05 μm | 1.5 μm | 1230 | 0 | 1.1 | Excellent |
| Comp Ex.2 | H | 80° C. | B | 160° C. | 1.3 μm | 1.5 μm | 1832 | −0.5 | 1.2 | Good |
| Comp.Ex 3 | H | 80° C. | E | 90° C. | 0.05 μm | 1.5 μm | 6 | 2.9 | 3.2 | Poor |
| Comp.Ex.4 | E | 90° C. | E | 90° C. | 0.05 μm | 1.5 μm | 5 | 2.8 | 3.3 | Poor |

TABLE 2-continued

|  | Upper layer polyurethane | | Lower layer polyurethane | | Thickness of coating | | Number of minute | Electromagnetic | Increase in repeat coefficient | Coating |
|---|---|---|---|---|---|---|---|---|---|---|
|  | Name | Tg | Name | Tg | Upper layer | Lower layer | protrusions | characteristics | of friction | damage |
| Comp Ex 5 | H | 80° C. | G | 90° C. | 0.05 μm | 1.5 μm | 15] | 2.9 | 2.8 | Poor |
| Comp.Ex.6 | H | 80° C. | B | 160° C. | 0.05 μm | 1.5 μm | 1350] | −1.8 | 1.1 | Good |

TABLE 3

|  | Upper layer polyurethane | | Lower layer polyurethane | | Thickness of coating | | Number of minute | Electromagnetic | Increase in repeat coefficient | Coating |
|---|---|---|---|---|---|---|---|---|---|---|
|  | Name | Tg | Name | Tg | Upper layer | Lower layer | protrusions | characteristics | of friction | damage |
| Embodiment 9 | A | 100° C. | H | 80° C. | 0.05 μ | 1.5 μ | 10 | 3.1 | 1.5 | Excellent |
| Embodiment 10 | B | 160° C. | H | 80° C. | 0.05 μ | 1.5 μ | 128 | 2.4 | 1.1 | Excellent |
| Embodiment 11 | C | 200° C. | H | 80° C. | 0.05 μ | 1.5 μ | 948 | 1.5 | 1 | Excellent |
| Embodiment 12 | F | 100° C. | H | 80° C. | 0.05 μ | 1.5 μ | 24 | 2.6 | 1.1 | Excellent |
| Embodiment 13 | B | 160° C. | H | 80° C. | 1.0 μ | 1.5 μ | 753 | 2.3 | 1.1 | Excellent |
| Embodiment 14 | B | 160° C. | H | 80° C. | 0.05 μ | 1.5 μ | 213 | 1.8 | 1.1 | Excellent |
| Comp.Ex.7 | D | 220° C. | H | 80° C. | 0.05 μ | 1.5 μ | 1240 | 0 | 1.1 | Excellent |
| Comp.Ex.8 | E | 90° C. | H | 80° C. | 1.3 μ | 1.5 μ | 15 | 2.8 | 2.6 | Poor |
| Comp.Ex.9 | G | 90° C. | H | 80° C. | 0.05 μ | 1.5 μ | 20 | 2.6 | 3.2 | Poor |
| Comp.Ex.10 | B | 160° C. | H | 80° C. | 1.3 μ | 1.5 μ | 1435 | −0.3 | 2.3 | Good |

EVALUATION RESULTS

Embodiments 1–4 and 7, in which polyurethane, the glass transition temperature of which fell within a range of 100 to 200° C., was employed in the lower layer and the number of surface protrusions 10 to 20 nm in height present on the topmost magnetic layer fell within a range of 5 to 1,000 per 100 $\mu m^2$, exhibited good electromagnetic characteristics, little increase in the repeat coefficient of friction, and had good running durability without coating damage.

Embodiments 5 and 6, in which polyurethane, the glass transition temperature of which fell within a range of 100 to 200° C., was employed in the upper layer and lower layer, also exhibited good electromagnetic characteristics and running durability.

Comparative Example 1, in which polyurethane with a Tg exceeding the range of the present invention was employed in the lower layer and in which the number of surface protrusions of 10 to 20 nm in height present on the topmost magnetic layer exceeded the range of the present invention, exhibited poorer electromagnetic characteristics than the embodiments.

Comparative Example 2, in which the Tg of the polyurethane contained in the lower layer fell within the range of the present invention, but the number of surface protrusions of 10 to 20 nm in height present on the topmost magnetic layer exceeded the range of the present invention, exhibited poorer electromagnetic characteristics than the embodiments, and following repeated running, exhibited scratches in the coating surface.

Comparative Examples 3 to 5, in which the number of surface protrusions of 10 to 20 nm in height present on the topmost magnetic layer fell within the range of the present invention, but in which the polyurethane contained in the lower layer had a Tg falling below the range of the present invention, had good electromagnetic characteristics but exhibited a great increase in the coefficient of friction with repeated running, substantial coating damage following repeated running, and poor running durability.

Comparative Example 6, which was prepared by the same method as in Embodiment 2, with the exception that the quantity of cyclohexanone employed during kneading of the lower layer liquid was changed from 30 to 60 parts, had more surface protrusions of 10 to 20 nm in height present on the topmost magnetic layer than Embodiment 2. This was attributed to poor dispersibility due to a low solid component concentration in the lower layer coating liquid, causing an increase in the number of protrusions. Comparative Example 6 had markedly poorer electromagnetic characteristics than the embodiments and showed more coating damage following repeated running than the embodiments.

Embodiments 8 to 13, in which polyurethane with a glass transition temperature falling within the range of 100 to 200° C. was employed in the topmost magnetic layer, and in which the number of surface protrusions of 10 to 20 nm in height present on the topmost magnetic layer fell within the range of 5 to 1,000 per 100 $\mu m^2$, exhibited good electromagnetic characteristics, little increase in the repeat coefficient of friction, and good running durability without coating damage.

Comparative Example 7, in which polyurethane with a Tg exceeding the range of the present invention was employed in the topmost magnetic layer and in which the number of surface protrusions of 10 to 20 nm in height present on the topmost magnetic layer exceeded the range of the present invention, exhibited poorer electromagnetic characteristics than the embodiments.

Comparative Examples 8 and 9, in which the number of surface protrusions of 10 to 20 nm in height present on the topmost magnetic layer fell within the range of the present invention, but polyurethane with a Tg falling below the range of the present invention was employed in the topmost magnetic layer, exhibited good electromagnetic characteristics, but also exhibited a greatly increased coefficient of friction due to repeat running, substantial coating damage following repeat running, and poor running durability.

Comparative Example 10, in which polyurethane with a Tg falling within the range of the present invention was employed in the topmost magnetic layer, but the number of surface protrusions of 10 to 20 nm in height present on the topmost magnetic layer exceeded the range of the present invention, exhibited poorer electromagnetic characteristics than the embodiments and scratches on the coating surface following repeat running.

The present invention yields a magnetic recording medium with good electromagnetic characteristics, little coating damage due to repeat running, and good running durability.

The present disclosure relates to the subject matters contained in Japanese Patent Application No. 2001-311007 filed on Oct. 9, 2001 and Japanese Patent Application No. 2001-317258 filed on Oct. 15, 2001, which are expressly incorporated herein by reference in its entirety.

What is claimed is:

1. A magnetic recording medium comprising a lower layer comprising a magnetic powder or nonmagnetic powder and a binder and one or more upper magnetic layers comprising a ferromagnetic powder and a binder in this order on a nonmagnetic support, wherein at least said lower layer comprises a binder consisting of polyurethane resin having a glass transition temperature ranging from 100 to 200° C., and a magnetic layer positioned as the topmost layer among said upper magnetic layers comprises 5 to 1,000 surface protrusions of 10 to 20 nm in height per 100 $\mu m^2$ on the surface thereof.

2. A magnetic recording medium comprising a lower layer comprising a magnetic powder or nonmagnetic powder and a binder and one or more upper magnetic layers comprising a ferromagnetic powder and a binder in this order on a nonmagnetic support, wherein at least a magnetic layer positioned as the topmost layer among said upper magnetic layers comprises a binder consisting of polyurethane resin having a glass transition temperature ranging from 100 to 200° C., and said magnetic layer positioned as the topmost layer among the upper magnetic layers comprises 5 to 1,000 surface protrusions of 10 to 20 nm in height per 100 $\mu m^2$ on the surface thereof.

3. The magnetic recording medium according to claim 1 or 2, wherein said polyurethane resin has a glass transition temperature ranging from 140 to 180° C.

4. The magnetic recording medium according to claim 1 or 2, wherein said magnetic layer positioned as the topmost layer among said upper magnetic layers comprises 5 to 200 surface protrusions of 10 to 20 nm in height per 100 $\mu m^2$ on the surface thereof.

5. The magnetic recording medium according to claim 1 or 2, wherein said polyurethane resin is polyurethane resin comprising a diol component having a ring-structure and alkyl group with 2 to 18 carbon atoms.

6. The magnetic recording medium according to claim 1 or 2, wherein said polyurethane resin has a urethane group concentration ranging from 2.5 to 6.0 mmol/g.

7. The magnetic recording medium according to claim 1 or 2, wherein said polyurethane resin has a weight average molecular weight (Mw) ranging from 30,000 to 200,000.

8. The magnetic recording medium according to claim 1 or 2, wherein said upper magnetic layer is a single layer, and said upper magnetic layer has a thickness ranging from 0.05 to 1.0 $\mu$m.

9. The magnetic recording medium according to claim 8, wherein said upper magnetic layer has a thickness ranging from 0.05 to 0.5 $\mu$m.

10. The magnetic recording medium according to claim 1 or 2, wherein said upper magnetic layers consist of two or more magnetic layers, and a magnetic layer positioned as the topmost layer has a thickness ranging from 0.05 to 1.0 $\mu$m.

11. The magnetic recording medium according to claim 10, wherein said magnetic layer positioned as the topmost layer has a thickness ranging from 0.05 to 0.5 $\mu$m.

12. The magnetic recording medium according to claim 10, wherein said upper magnetic layers have a total thickness ranging from 1.0 to 2.5 $\mu$m.

13. The magnetic recording medium according to claim 10, wherein said upper magnetic layers have a total thickness ranging from 1.0 to 1.5 $\mu$m.

14. The magnetic recording medium according to claim 1 or 2, wherein said ferromagnetic powder is cobalt-containing ferromagnetic iron oxide or ferromagnetic alloy powder with a $S_{BET}$ specific surface area of 40 to 80 m²/g.

* * * * *